JOHN CHARLTON.
Improvement in Coupling for Shafting.

No. 126,183.  Patented April 30, 1872.

Witnesses:
Jacob E. Schiedt
Alfred C. Savidge

Inventor:
John Charlton
by John A. Wiedersheim
atty.

126,183

UNITED STATES PATENT OFFICE.

JOHN CHARLTON, OF PHILADELPHIA, PENNSYLVANIA.

IMPROVEMENT IN COUPLINGS FOR SHAFTINGS.

Specification forming part of Letters Patent No. 126,183, dated April 30, 1872.

*To all whom it may concern:*

Be it known that I, JOHN CHARLTON, of the city and county of Philadelphia and State of Pennsylvania, have invented new and useful Improvements in Couplings for Shaftings, &c.; and I do hereby declare the following to be a clear and exact description of the nature thereof, sufficient to enable others skilled in the art to which my invention appertains to fully understand, make, and use the same, reference being had to the accompanying drawing making part of this specification, in which—

Figure 1:
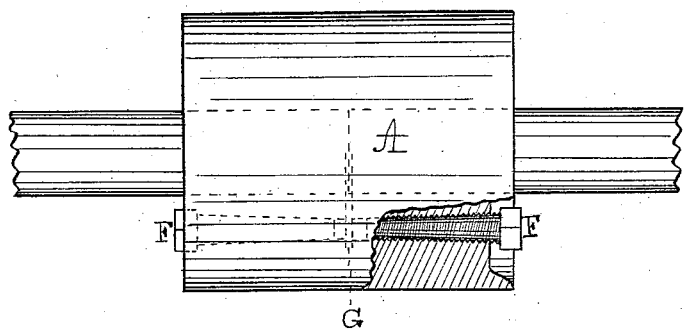
Figure 2:
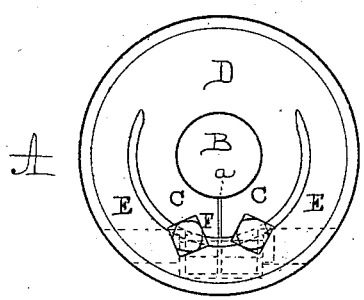
Figure 3:
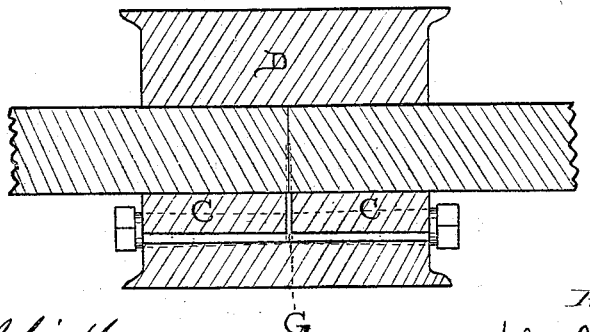

Figure 1 is a side view (partly broken away) of the device illustrating my invention. Fig. 2 is an end view. Fig. 3 is a central longitudinal section.

Similar letters of reference indicate corresponding parts in the several figures.

This invention relates to couplings for shafting, pulley or wheel hubs, &c. It consists of a body formed with clamps and an exterior portion, in connection with tightening-screws, bolts, or wedges, forming what may be termed a covered coupling. It also consists in conical screws, wedges, or bolts for tightening the clamps. It also consists in forming the clamps in parts so that one shaft may be coupled or uncoupled and tightened or loosened without interference of or interfering with or disturbing the other shaft.

Referring to the drawing, A represents the body of the coupling or hub of a wheel or pulley, and B the opening for the shafting or axis. This body is cored or otherwise separated longitudinally at a point between periphery and center, so as to form a segment of a circle, which, when divided at *a*, will leave jaws C C, which I denominate clamps, and whose inner faces constitute a portion of the opening B. D represents a portion of the body A, which is not cored or separated therefrom, and E is the portion which surrounds the clamps C. The clamps consist of curved pieces extending longitudinally, and have their ends at *a*, facing each other. They are adapted to be moved toward the shafting or axis in the opening B, so as to embrace the same or recede therefrom. To this end I form on the outer faces of the clamps, near the ends *a*, conical grooves, which extend longitudinally, and likewise form, on the adjacent portions of the part E of the body A, corresponding conical grooves, into which are inserted conical screws, wedges, or bolts F.

It will be perceived that the clamps C C may be readily forced against the shafting or axis by properly inserting the screws, wedges, or bolts. Should the body and shafting or axis become loose they are readily tightened by forcing the screws, wedges, or bolts further into the conical openings. The shafting or axis may be uncoupled from the body A by operating the screws, wedges, or bolts so that they withdraw, whereby the clamps expand or open, and thereby release their hold. The bolts, wedges, or screws may extend transversely through the clamps, and access thereto be had through relative openings in the portion E of the body; but the operation is in a manner similar to that which has been described.

The clamps C are divided transversely at G, so that the pair of clamps at one side is independent of that on the other side, whereby one shafting may be coupled or uncoupled and tightened or loosened without interference of or interfering with or disturbing the other shafting. If one shaft is loose and requires tightening, or, for reasons, must be removed, the proper operation may be performed without reference to the other shaft. Should there be some variation in the diameters of the shafts, the clamps on the opposite sides of the body A will accommodate themselves thereto, whereby it is not absolutely necessary that the shafts are actually of the same diameter, although it is not well to employ shafts wherein the difference is material.

Clips may be secured to the ends of the body A, and adapted to enter notches in the shafting, as auxiliary to the clamps for preventing longitudinal movement of the shafting.

The device will be found to be simple, practical, and useful.

Having thus described my invention, what I claim as new, and desire to secure by Letters Patent, is—

1. A covered coupling, consisting of the clamps formed in the body A and the portions D E, in connection with tightening-screws, wedges, or bolts, operating together, as described.

2. The conical screws, wedges, or bolts, and the conical openings, in connection with the clamps C and body A, applied and operating as described.

3. The clamps, divided transversely, so that one pair or set is independent of the other, substantially as and for the purpose described.

The above signed by me this 30th day of March, 1872.

JOHN CHARLTON.

Witnesses:
   HENRY R. HEYL,
   AUGUST BREHMER.